/ Patented Apr. 12, 1949

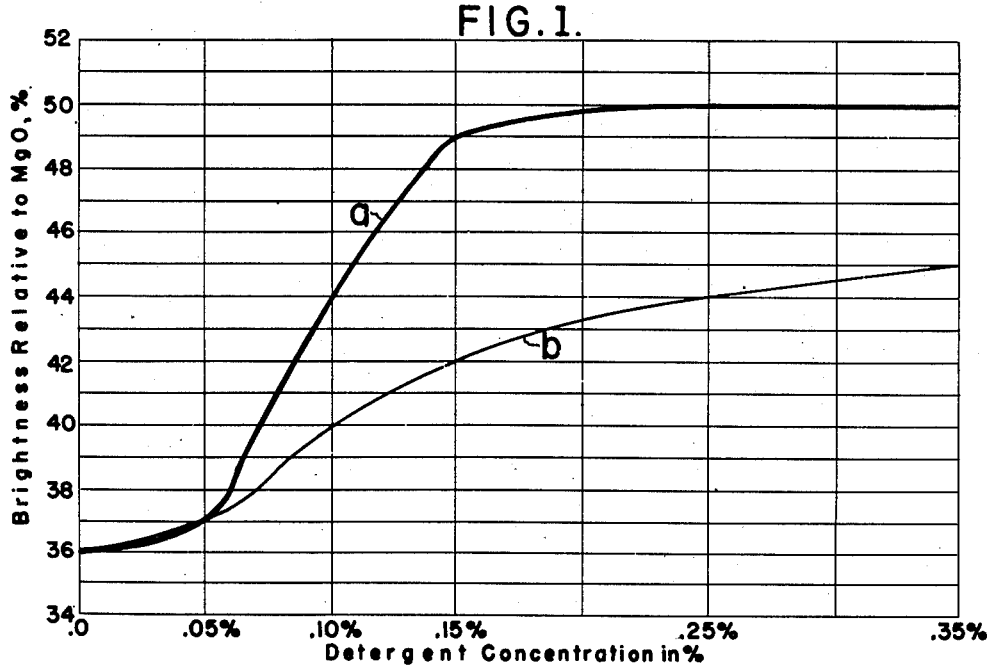
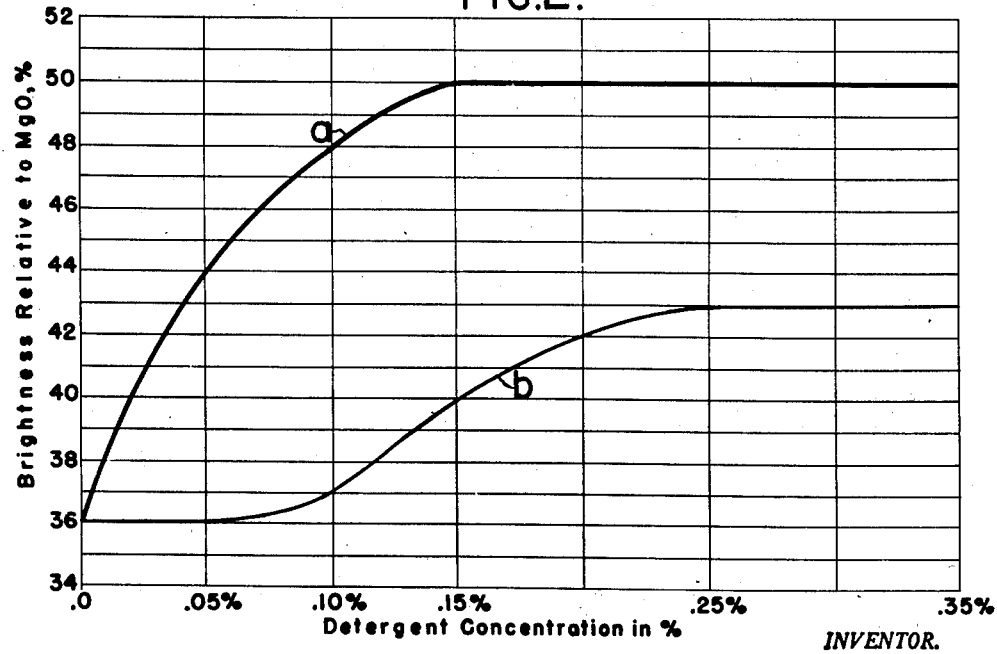

2,467,170

UNITED STATES PATENT OFFICE 2,467,170

ALKYL SUBSTITUTED AROMATIC SULFONATES

Viktor Weinmayr, Pitman, N. J., assignor to E. I. du Pont de Nemours & Company, Wilmington, Del., a corporation of Delaware Application October 15, 1947, Serial No. 779,986

3 Claims. (Cl. 260—505)

This invention deals with a group of alkyl-aromatic sulfonic acids and their salts useful as surface active agents, particularly as detergents and wetting agents.

It is an object of this invention to provide new detergent compounds of superior properties both as detergents and as wetting agents.

The use of alkylated aromatic sulfonic acids as detergents and wetting agents is well known. Both sulfonated naphthalene and benzene derivatives have been indicated in the art, and the length of the alkyl chain has been varied from as low as 3 carbon atoms to as high as 20 carbon atoms, both straight-chain and branched-chain radicals being often employed.

I have now found that the limited group of compounds having the particular structure defined hereinbelow possesses outstanding properties both as detergents and as wetting agents.

The novel compounds embraced in this invention are characterized by possessing a sulfonated benzene ring which is attached to the tertiary carbon atom of a 2-methyl alkane having a total of 10 to 14 carbon atoms and being straight-chained in the remainder of its length. Altogether then, the compounds of this invention are defined by the formula

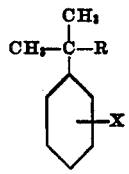

wherein R is a straight-chain, saturated aliphatic hydrocarbon radical of 7 to 11 carbon atoms, while X represents the sulfonic acid radical or a salt thereof.

This invention embraces the above compounds in free acid form as well as in the form of water-soluble salts thereof, as obtained for instance by neutralizing the free acid with inorganic or organic bases. For the purpose of this invention, the term "water-soluble" shall be construed as meaning that the compound concerned is soluble in water to an extent of at least 0.2% by weight.

The products of this invention are prepared by sulfonating the corresponding hydrocarbon with oleum and, if desired, neutralizing the sulfonic acid thus formed with an alkali-metal hydroxide, an alkaline-earth hydroxide, or any other alkaline agent such as a primary, secondary or tertiary amine or a quaternary nitrogenous base. The alkylaromatic compounds themselves may be prepared by any suitable synthesis, such as the Friedel-Crafts reaction or reactions based on a Grignard synthesis. These methods of preparation are illustrated in the following examples, which however are given merely for illustrative purposes, without any intent to limit the invention thereby.

The annexed drawing represents graphically the data obtained in detergency tests on my novel compounds, as reported in Table II hereinbelow.

EXAMPLE I. 2-METHYL-2-PHENYL-DECANE

A. *Preparation of the hydrocarbon*

To a suspension of 12 parts of magnesium in 300 parts of boiling anhydrous ether are added slowly 75.5 parts of 3-chloro-2-methyl-2-phenyl-propane (prepared from benzene and methallyl chloride by the method of U. S. P. 2,275,312) in 50 parts of ether. Addition requires about three hours, and the mixture is refluxed for an additional two hours. A solution of 48 parts of n-heptaldehyde in 50 parts of anhydrous ether is then slowly added, and the mixture is refluxed for two hours. It is then poured into 500 parts of water and acidified with hydrochloric acid. The upper layer is separated and washed once with 5% sodium carbonate solution. The ether is removed by distillation and the residue is heated for two hours at 200° to 290° C. with 25 parts of potassium acid sulfate. The organic upper layer is decanted and distilled. The fraction boiling at 110° C. (at 2 mm.) is collected, and constitutes a mixture of 2-methyl-2-phenyldecene-3 and 2-methyl-2-phenyldecene-4.

A mixture of 75 parts of the above product, 75 parts of glacial acetic acid and 0.1 part of platinum catalyst (Organic Synthesis, vol. I, page 452) are shaken at 25°–40° C. under three atmospheres hydrogen pressure for two hours. The catalyst is removed by filtration and the acetic acid by distillation. The product is distilled and the distillate washed twice with 10 parts of concentrated sulfuric acid. The product is then washed with sodium carbonate solution and distilled. 65 parts of material boiling at 140°–145° C. at 1 mm. is obtained. The product gives a refractive index of $n_D^{20}=1.4875$ and density $$D_{20}^{20}=0.8584$$

Analysis calculated for $C_{17}H_{28}$: C=87.85, H=12.15. Found: C=87.95, H=12.90.

B. *Sulfonation*

For sulfonation, 27 parts of 20% oleum are added slowly to 15 parts of the above product and the mixture is agitated and cooled so as to hold the temperature at 20°–30° C. After all of oleum has been added, the temperature of the reaction mixture is raised to 40° to 50° C. and held at this temperature for one-half hour. The product is poured into 90 parts of water and 10 parts of alcohol is added in order to obtain a homogeneous solution. The mixture is neutralized to a pH of 7–8 with 20% sodium hydroxide solution. The mixture is drum dried to yield 50 parts of product containing about 40% active ingredient and 60% sodium sulfate. The active ingredient may be isolated in a pure state by extraction of the 40% product with hot alcohol.

Instead of sodium hydroxide in the above example the corresponding equivalent weight of any other hydroxide or base which leads to a water-soluble sulfonate may be used, for instance potassium hydroxide, calcium hydroxide, magnesium hydroxide, ammonia, monomethylamine, dimethylamine, trimethylamine, tetramethylammonium hydroxide, the corresponding ethylamines, the various ethanolamines (mono-, di- and tri-), etc.

Example II

The procedure is the same as in Example I, except that the 48 parts of n-heptaldehyde therein employed are replaced by an equivalent quantity of any one of the following aldehydes:

n-hexanal ($C_5H_{11}.CHO$)
n-octanal ($C_7H_{15}.CHO$)
n-nonanal ($C_8H_{17}.CHO$)

or n-decanal ($C_9H_{19}.CHO$)

A high quality detergent, both as to detergent power and speed of wetting, is obtained in each instance.

Example III. 2-Methyl-2-Phenyldecane by Alkylation Process

To a mixture of 21 parts of anhydrous hydrogen fluoride and 40 parts of benzene in a copper vessel 17 parts of 2-methyldecene-1 (prepared by dehydration of 2-methyldecanol-2) are added slowly with stirring and cooling to hold the temperature of the reaction mass at 0–5° C. After 18 hours stirring at 0–5° C., the mixture is poured slowly into 500 parts of water. The upper layer is separated and washed with 5% sodium carbonate solution and the product is distilled. The material obtained agrees in physical properties with the product of Example I.

Sulfonation and neutralization are carried out as described in Example I.

In a similar manner the homologues of the above compound can be prepared by using equivalent amounts of 2-methylnonene-1, 2-methylundecene-1, 2-methyldodecene-1, and 2-methyltridecene-1.

Evaluation of the products

The evaluation of the above products for wetting power has been carried out as described in the AATC (American Association of Textile Chemists and Colorists) Year Book for 1946, page 230. The wetting power is gauged by the concentration in grams of active ingredient per liter of solution necessary to wet in 25 seconds. In the tables below, this concentration will be designated as the standard wetting concentration. For detergent evaluation, the method described by O. C. Bason, American Dyestuff Reporter, vol. 34, pages P556–P561, has been used. The results are expressed in tabular form using the percent reflectance of light from the surface of the soiled fabric relative to the reflectance of magnesium oxide as a measure of "brightness." The detergency power was tested at five different concentrations, both in hard water and in soft water. For the purpose of the hard water tests, water was employed containing 360 P. P. M. of alkaline-earth chlorides calculated as calcium carbonate.

Table I below illustrates the pronounced improvement in wetting power obtained by introduction of the dimethyl group on the carbon attached to the aromatic ring in contrast to compounds which have the benzene sulfonate group attached to a primary or secondary carbon atom.

Table I

| Compound | Standard wetting concentration in g./l. (soft water) |
| --- | --- |
| Sodium sulfonate of— | |
| 2-methyl-2-phenyldecane | 0.5 |
| 2-phenyldecane | 0.9 |
| 2-phenyldodecane | 0.9 |
| 1-phenyldodecane | over 2.0 |

The compounds in the above table all show good detergency, but only the first product, wherein the phenyl group is attached to a tertiary carbon atom, shows high wetting speed.

In Table II are shown both standard wetting concentration and detergent power, the comparison being made with a compound which possesses the phenyl group in the 1-carbon atom of a highly branched alkane.

Table II

| Graph No. | Compound | A. Standard wetting concentration in g./l. (soft water) |
| --- | --- | --- |
| (a) | Sodium sulfonate of 2-methyl-2-phenyldecane | 0.5 |
| (b) | Sodium sulfonate of 4-isobutyl 6-methyl-1-phenylheptane | over 2.0 |

B. Brightness relative to MgO, in per cent:
1. In hard water—

| Concentration (%) | 0 | 0.05 | 0.10 | 0.15 | 0.25 | 0.35 |
| --- | --- | --- | --- | --- | --- | --- |
| Compound (a) | 36 | 37 | 44 | 49 | 50 | 50 |
| Compound (b) | 36 | 37 | 40 | 42 | 44 | 45 |

2. In soft water—

| Concentration | 0 | 0.05 | 0.10 | 0.15 | 0.25 | 0.35 |
| --- | --- | --- | --- | --- | --- | --- |
| Compound (a) | 36 | 44 | 48 | 50 | 50 | 50 |
| Compound (b) | 36 | 36 | 37 | 40 | 43 | 43 |

The detergency data of Table II are represented graphically in the drawing, wherein Figure 1 represents the hard-water test and Figure 2, the soft water data. The individual curves are marked $a$ and $b$ to correspond with the compounds designated in the table. It will be noted that curve $b$ in each figure drops considerably below curve $a$ for the major portion of the range of concentrations tested.

Additional substitution in the benzene ring appears to be detrimental to wetting speed. This is shown in Table III.

*Table III*

| Compound | Standard wetting concentration in g./l. (soft water) |
|---|---|
| Sodium sulfonate of— | |
| 2-methyl-2-phenyldecane | 0.5 |
| 2-methyl-2(2,5-dimethylphenyl)-nonane | 1.5 |
| 2,6,8,8 tetramethyl-2-(2,5-dimethylphenyl)-nonane | over 2.0 |

The above tests show that the products of this invention possess an unusual and unexpected combination of high wetting speed and high detergency. Although there are numerous compounds which show detergency or wetting power equal to the products of this invention, my products are unique in that both properties are at a high level in a single compound. This is a great advantage since it enables the interchangeable use of a single product for either washing or wetting.

It will be understood that many variations are possible in the methods of synthesizing the novel compounds and in the choice of base for neutralizing the sulfonic acid groups. Apart from the last-mentioned freedom of variation, however, the number of sulfonic acids falling within the scope of this invention is limited and is represented in fact by the following 5 compounds:

2-methyl-2-phenylnonanesulfonic acid
2-methyl-2-phenyldecanesulfonic acid
2-methyl-2-phenylundecanesulfonic acid
2-methyl-2-phenyldodecanesulfonic acid
2-methyl-2-phenyltridecanesulfonic acid

I claim as my invention:

1. A compound of the general formula

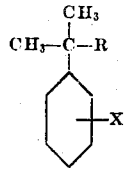

wherein R is a straight-chained alkyl radical of 7 to 11 carbon atoms, while X designates a radical selected from the group consisting of the sulfonic acid group and water-soluble salts thereof.

2. The alkylated benzene-alkali-metal-sulfonates characterized by the formula

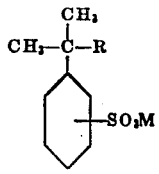

wherein R is a straight-chained alkyl radical of 7 to 11 carbon atoms, while M is an alkali metal.

3. A detergent composition comprising as active ingredient a compound consisting of a monosulfonated benzene attached to the tertiary carbon atom of a 2-methyl alkane having a total of 10 to 14 carbon atoms and being straight-chained in the remainder of its length.

VIKTOR WEINMAYR.

REFERENCES CITED

The following references are of record in the file of this patent:

UNITED STATES PATENTS

| Number | Name | Date |
|---|---|---|
| 2,161,173 | Kyrides | June 6, 1939 |
| 2,199,131 | Flett | Apr. 30, 1940 |
| 2,244,512 | Brandt | June 3, 1941 |
| 2,314,255 | Toone | Mar. 16, 1943 |
| 2,314,929 | Flett | Mar. 30, 1943 |
| 2,330,922 | Riegler | Oct. 5, 1943 |

OTHER REFERENCES

Suter, "Organic Chemistry of Sulfur," Wiley & Sons, Inc., New York, New York, 1944, page 206.

Certificate of Correction

Patent No. 2,467,170.                                                                 April 12, 1949.

VIKTOR WEINMAYR

It is hereby certified that error appears in the printed specification of the above numbered patent requiring correction as follows:

Column 4, line 4, for the name "Bason" read *Bacon*;
and that the said Letters Patent should be read with this correction therein that the same may conform to the record of the case in the Patent Office.

Signed and sealed this 13th day of September, A. D. 1949.

[SEAL]

JOE E. DANIELS,
*Assistant Commissioner of Patents.*